US012771705B2

(12) United States Patent
Pagarkar

(10) Patent No.: US 12,771,705 B2
(45) Date of Patent: Oct. 20, 2026

(54) INTRUSION DETECTION FOR CONNECTED VEHICLES

(71) Applicant: Mubin Pagarkar, Palo Alto, CA (US)

(72) Inventor: Mubin Pagarkar, Palo Alto, CA (US)

(73) Assignee: Mubin Pagarkar

( * ) Notice: Subject to any disclaimer, the term of this patent is extended or adjusted under 35 U.S.C. 154(b) by 22 days.

(21) Appl. No.: 18/908,208

(22) Filed: Oct. 7, 2024

(65) Prior Publication Data

US 2025/0039207 A1 Jan. 30, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS

2017/0072850 A1* 3/2017 Curtis ................ B60K 31/0008
2019/0322233 A1* 10/2019 Rivaya .............. B60R 21/01552
2023/0122334 A1* 4/2023 Kadry ................. B60R 16/0232
701/29.2

* cited by examiner

*Primary Examiner* — William J. Goodchild

(57) ABSTRACT

The present disclosure generally relates to intrusion detection systems for connected vehicles. In some embodiments, a telemetric device that listens to messages transmitted via a controller area network (CAN) bus is described. In some embodiments, the telemetric device is connected to an on-board diagnostic port. In some embodiments, the telemetric device sends an alert when one or more anomalies are present in one or more messages transmitted via the CAN bus.

15 Claims, 5 Drawing Sheets

500

INTRUSION DETECTION FOR CONNECTED VEHICLES

BACKGROUND

Modern vehicles are complex, physical systems controlled by Electronic Control Units (ECUs) that communicate through at least one Controller Area Network (CAN) bus. Originally, the CAN bus was designed with a focus on reliability and error handling, but with little emphasis on security, as it was assumed to be isolated from external threats. However, the increasing connectivity of vehicles has exposed significant security flaws, as data transmitted via a CAN bus are broadcast to all nodes without encryption or authentication. Therefore, with increased connectivity, the vulnerabilities of the CAN bus designed is exposed, where an attacker can listen and send messages via a compromised node, threatening data integrity and privacy of modern vehicles.

As connectivity increases, the number of attackers and/or attack vectors for modern vehicles are also increasing. Modern vehicles face greater risks from potential attacks through various access points such as maintenance interfaces, Wi-Fi communication devices, and cellular modems. The lack of strong security measures in the original CAN bus architecture leaves CAN and/or vehicle vulnerable to cyberattacks, such as Denial of Service (DOS) attacks, replay attacks, and/or unauthorized diagnostic access attacks. To mitigate these risks, new security methods that can monitor, detect, and block unauthorized access to the vehicle, including the CAN bus, are needed.

FIELD

The present disclosure relates generally to software applications, and more specifically, to techniques for managing in-vehicle ecosystems.

SUMMARY

A novel system that can monitor, detect, and block unauthorized access to the vehicle has been identified. This system is a comprehensive cybersecurity system designed to protect modern vehicles from potential threats within the CAN bus, which is central to in-vehicle communication. The system includes a telematic device that plugs into the car's onboard diagnostics port to monitor and analyze CAN bus messages and/or data in real time, detecting anomalies by comparing incoming data against a statistical database. In some embodiments, the database is pre-loaded on the telematic device. In some embodiments, the database is continuously updated with new anomaly patterns identified by deep and machine learning algorithms running on cloud-based software. In some embodiments, when an anomaly is detected, the telematic device generates an alert that can be integrated with other systems to initiate immediate countermeasures.

The system's cloud component aggregates data from multiple connected vehicles, refining machine learning models to predict future anomalies and enhancing the system's ability to detect both known and unknown threats. The system has an intrusion detection system, which employs a combination of deep Convolutional Neural Networks and generative artificial intelligence and/or machine learning models to capture and analyze statistical features of CAN bus data. The intrusion detection system is designed to identify and respond to anomalies in real-time, ensuring robust protection against a wide range of cyberattacks. This multi-layered approach, combining real-time monitoring, machine learning, and cloud-based intelligence, provides a proactive defense mechanism for connected vehicles.

In some embodiments, a telematic device that is connected to an on-board diagnostic port of a vehicle is described. In some embodiments, the telemetric device includes one or more processors and memory storing one or more programs configured to be executed by the one or more processors. In some embodiments, the one or more programs including instructions for: receiving, via the on-board diagnostic port of the vehicle, one or more messages transmitted via a controller area network (CAN) bus; processing the one or more messages to detect whether one or more anomalies are present, including: retrieving data from a database updated using a Convolutional Neural Network (CNN) to detect a first set of one or more events and a machine learning model to detect a second set of one or events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly.

In some embodiments, computer-readable storage medium (e.g., transitory or non-transitory) storing one or more programs configured to be executed by one or more processors is described. In some embodiments, the one or more programs including instructions for: receiving, via the on-board diagnostic port of the vehicle, one or more messages transmitted via a controller area network (CAN) bus; processing the one or more messages to detect whether one or more anomalies are present, including: retrieving data from a database updated using a Convolutional Neural Network (CNN) to detect a first set of one or more events and a machine learning model to detect a second set of one or events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly.

In some embodiments, a method is described. In some embodiments, the method is performed at a telematic device that is connected to an on-board diagnostic port of a vehicle. In some embodiments, method includes one or more processors and memory storing one or more programs configured to be executed by the one or more processors. In some embodiments, the one or more programs including instructions for: receiving, via the on-board diagnostic port of the vehicle, one or more messages transmitted via a controller area network (CAN) bus; processing the one or more messages to detect whether one or more anomalies are present, including: retrieving data from a database updated using a Convolutional Neural Network (CNN) to detect a first set of one or more events and a machine learning model to detect a second set of one or events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly.

Executable instructions for performing these functions are, optionally, a non-transitory computer-readable storage medium or other computer program product configured for execution by one or more processors. Executable instructions for performing these functions are, optionally, included in a transitory computer-readable storage medium or other computer program product configured for execution by one or more programs.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
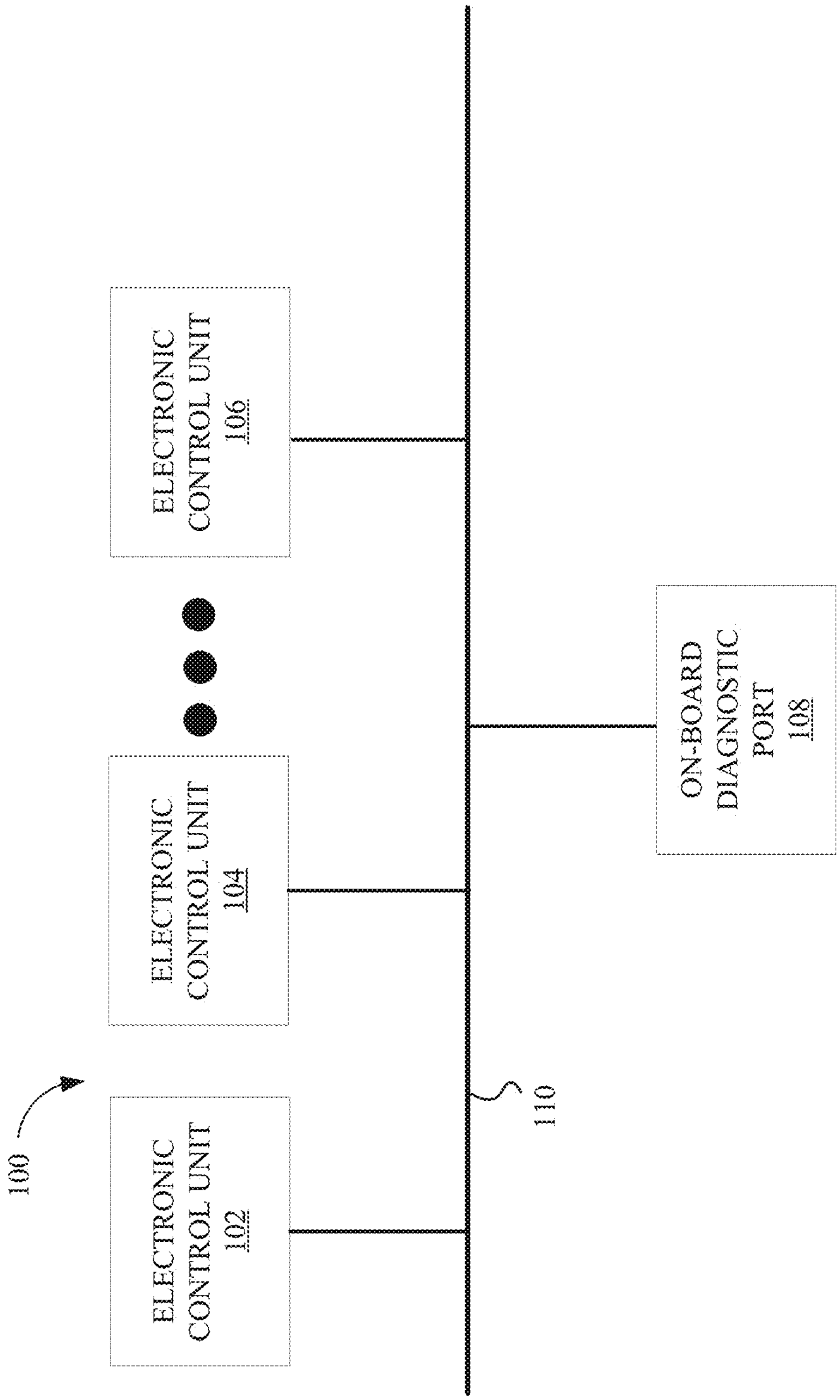
FIG. 1 is a system architecture diagram for a computer system of a vehicle in accordance with some embodiments.

The description described below sets forth one or more exemplary embodiments, examples, methods, parameters, etc. However, it should be understood that the description below is not intended to limit the scope of the present disclosure but to serve as a description and/or example of embodiments to achieve one or more technical advantages in the field of technology. Techniques, methods, and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," "according to," "because of a determination," and/or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," according to [the stated condition or event]," because of a determination of [the stated condition or event]," or "in accordance with a determination that [the stated condition or event]" depending on the context.

Although the following description uses numeric terms, such as "first," "second," "third," etc., to describe various elements, these elements should not be limited by the terms. In some embodiments, these terms are used to distinguish one element from another. For example, a component could be termed a first component, and, similarly, a component could be termed a second component, without departing from the scope of the various described embodiments. In some embodiments, the first component and the second component are two separate references to the same component. In some embodiments, the first component and the second component are both components, but they are not the same component or the same type of component.

FIG. 1 is a system architecture diagram for computer system 100 of a vehicle (e.g., a car, sports utility vehicle, motorcycle, drone, and/or truck). As illustrated in FIG. 1, vehicle computer system 100 includes multiple electronic control units (ECUs) (e.g., ECUs 102-106) along with on-board diagnostic (OBD) port 108, where the ECUs and the OBD ports are directly coupled to controller area network (CAN) bus 110. In some embodiments, more than three ECUs are connected to CAN bus 110 and/or are a part of in-vehicle computer system 100. However, for exemplary purposes and case of explanation, the other ECUs have been omitted. In some embodiments, the ECUs connected to CAN bus 110 include an engine control module (ECM) for managing engine functions, a transmission control module (TCM) for managing gear shifts, and/or an anti-lock braking system (ABS) module for managing braking. In some embodiments, other examples of ECUs include a Wi-Fi control module, an infotainment control module, a steering control module, an airbag control unit, a body control module, an electronic power steering control module, a climate control module, an instrument cluster control module, a parking assistance control module, and/or an adaptive cruise control module, amongst other types of ECUs common in the art.

At FIG. 1, data (e.g., CAN messages and/or CAN data) is transmitted via CAN bus 110 between components (e.g., ECUs and/or OBD port) of in-vehicle computer system 100. For example, the ECM transmits and receives data related to engine performance. The ECM sends data, such as engine speed, throttle position, and fuel injector timing to other ECUs, allowing them to adjust their functions accordingly. In some embodiments, the ECM also receives data from sensors, like the oxygen sensor, to optimize air-fuel mixture for better fuel efficiency and lower emissions, which can be crucial for ensuring that the engine runs smoothly and complies with environmental standards. As another example, the TCM transmits data via CAN bus 110 like the current gear position, clutch status, and transmission fluid temperature to the ECM and other systems. In some embodiments, the TCM receives information, via CAN bus 110, on engine torque and speed to coordinate smooth gear shifts and prevent mechanical stress. As yet another example, the ABS module monitors wheel speed sensors and sends information to the ECM and other control units via CAN bus 110, allowing the vehicle to adjust braking pressure and prevent wheel lock-up during emergency stops. In some embodiments, if the ABS module detects irregular wheel movement, such as skidding, the ABS module can send signals over CAN bus 110 that modulates the brakes, maintaining traction and stability.

At FIG. 1, when data is transmitted via CAN bus 110, each individual component can read and/or receive the data transmitted via CAN bus 110. Thus, at FIG. 1, any activity transmitted via CAN bus 110 is known and/or public to the components (and/or nodes) connected to CAN bus 110, which can become increasingly problematic when vehicles are connected to more external sources (e.g., applications, cloud services, and/or databases). This is because a vehicle being connected to more external sources allows malicious attackers to compromise a component that is connected to CAN bus 110 (e.g., via an increased number of entry points, such as maintenance interfaces, Wi-Fi access points, cellular modems, and Car2x Wi-Fi), where the malicious attacker and listen to and/or transmits messages that could impact vehicle operations and/or make operating the vehicle unsafe for people. Malicious attackers can use a variety of attacks to compromise vehicle systems. In some embodiments, the malicious attacker uses a DoS attack causing the vehicle network to be overwhelmed with false messages. In some embodiments, the malicious attacker uses one or more fuzzy attacks by sending involve random spoofed frames to disrupt network operations. In some embodiments, the malicious attacker uses replay attacks to intercept and retransmit messages to manipulate vehicle behavior. In some embodiments, the malicious attacker uses impersonation attacks by sending messages under a false identity, which can lead the vehicle to execute harmful commands under the guise of legitimate communication.

Figure 2:
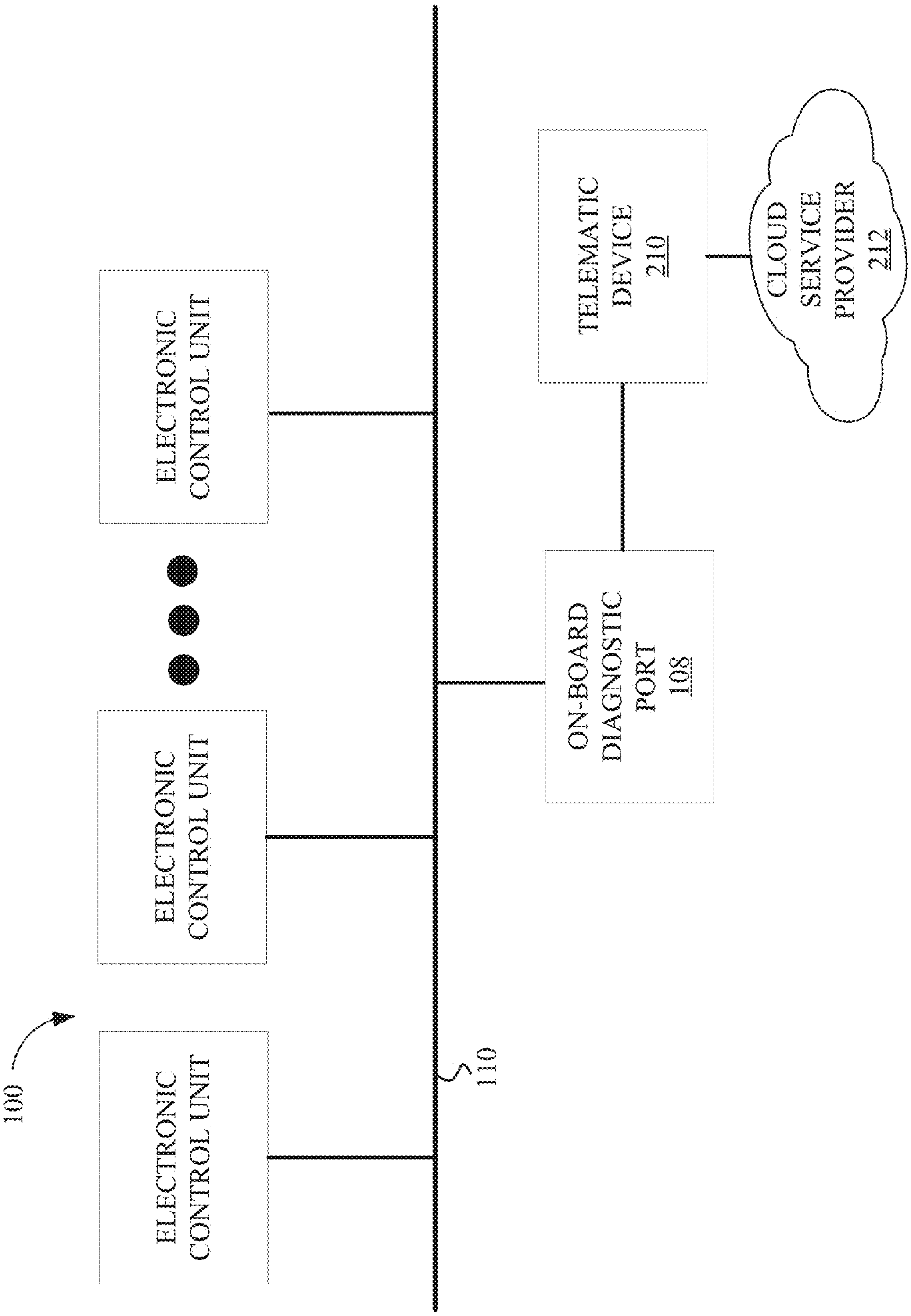
FIG. 2 is a system architecture diagram for a computer system of a vehicle in accordance with some embodiments.

FIG. 2 is a system architecture diagram for a computer system 100 of a vehicle in accordance with some embodiments. As illustrated, FIG. 2 includes the same components with respect to the ECUs (e.g., ECUs 102-106) and OBD port 108 as described above with respect to FIG. 1. However, FIG. 2 also includes telematic device 210 and cloud service provider 212. In some embodiments, as discussed below, telematic device 210 in combination with cloud service provider 212 make up an intrusion detection system (IDS) that is capable of identifying whether malicious attackers and/or unauthorized messages are present within computer system 100.

In some embodiments, the IDS is entirely included in telematic device 210 and cloud service provider 212 is omitted and/or not used as a part of the IDS. However, in these embodiments, telematic device 210 incorporates the components of cloud service provider 212 described below.

Figure 3:
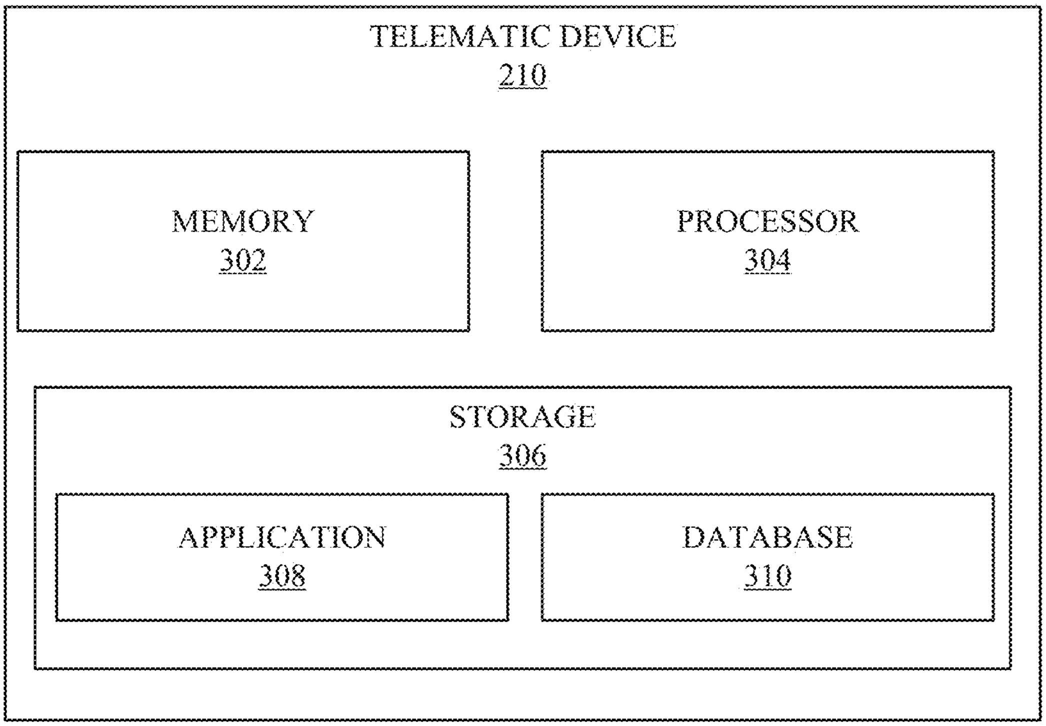
FIG. 3 is a block diagram for a telematic device in accordance with some embodiments.

As illustrated in FIG. 2, telematic device 210 is connected to (e.g., coupled to, in communication with, and/or inserted in) (e.g., directly or indirectly) OBD port 108. While telematic device 210 is connected to OBD port 108, telematic device 210 can receive and transmit messages via CAN bus 110. In other words, telematic device 210 can monitor communication transmitted the CAN bus 110 between ECUs and/or any other nodes that are connected to CAN bus 110, including any malicious nodes and/or attacker that are listening and receiving messages and/or data sent via CAN bus 110. Turning to FIG. 3, telematic device 210 includes memory 302, processor 304, and storage 306, where application 308 and database 310. While telematic device 210 is illustrated to have only one memory, processor, storage, application, and database, telematic device 210 can have multiple of these components in some embodiments.

In some embodiments, memory 302 can be any form of non-volatile or volatile storage medium that can store instructions and data for execution by a processor. For example, memory 302 can include read-only memory (ROM), random access memory (RAM), flash memory, magnetic storage devices, optical storage devices, and solid-state drives, among other types of memory. In some embodiments, memory 302 can store program instructions, operational data, configuration files, and any other form of digital information required for performing functions within a system, such as controlling various components of a vehicle or managing communication protocols like the CAN bus. In some embodiments, memory 302 stores pre-trained machine learning models, convolutional neural networks (CNNs), or artificial intelligence algorithms that facilitate the detection and processing of anomalies in vehicle data. In some embodiments, memory 302 is dynamically updated with new datasets or instructions from external sources, such as cloud service provider 212 of FIG. 2. In some embodiments, memory 302 is embedded within the system. In some embodiments, memory 302 is externally accessible for real-time updates and long-term storage of critical data.

In some embodiments, processor 304 is configured to execute instructions stored in memory 302 and carry out various operations of the system, such as processing data transmitted via the CAN bus and coordinating communication between different vehicle components. In some embodiments, processor 304 performs complex calculations and decision-making tasks in real time, such as executing machine learning models or analyzing sensor data to detect anomalies or other events. In some embodiments, the machine learning models and/or analyzation of sensor data are executed by processes of an application, such as application 308 of FIG. 3. In some embodiments, processor 304 manages the overall operation of the vehicle's electronic systems, including transmitting commands to other subsystems based on the data it receives and processes. In some embodiments, processor 304 handles multitasking and prioritizes processes based on system needs. For example, it can simultaneously monitor data coming from multiple ECUs, manage alerts, and interface with external systems, such as cloud service providers.

In some embodiments, storage 306 provides long-term retention of data and is responsible for storing components such as application 308 and database 310. In some embodiments, application 308 consists of software programs that control system functionalities, enabling the system to interface with the processor and other hardware components to perform desired operations. In some embodiments, application 308 is designed to manage tasks, such as real-time data analysis, communication with external systems, and trigger alerts in case of detected anomalies.

In some embodiments, database 310 is stored with data indicating a set of anomalies that have been preidentified and/or pre-loaded onto telematic device 210 (e.g., before telematic device 210 was connected to OBD port 108 of FIG. 2). In some embodiments, database 310 is updated in real-time as a result of one or more machine learning models and/or convolution neural networks running on a cloud service provider (e.g., cloud service provider 212 of FIG. 2). In some embodiments, database 310 contains structured data, such as vehicle operational logs, historical CAN bus data, and reference data for machine learning models. In some embodiments, the database is used for retrieving, updating, and storing information relevant to the detection and analysis of vehicle events, ensuring the system has access to both historical and real-time data for effective decision-making. In some embodiments, the data in database 310 is compared to one or more messages that are sent via CAN bus 110 of FIG. 2 in order for one or more anomalies to be detected by telematic device 210.

Figure 4:
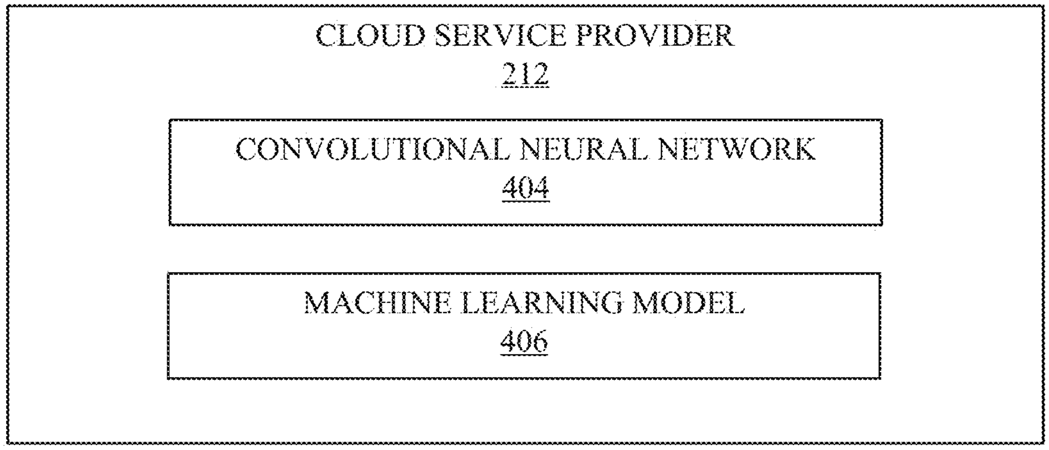
FIG. 4 is a block diagram for one or more components of an intrusion detection system hosted on a cloud service provider in accordance with some embodiments.

Turning back to FIG. 2, cloud service provider 212 is in communication with (e.g., wireless communication with and/or indirect communication with) telematic device 210. Turning to FIG. 4, which is a block diagram for one or more components of an intrusion detection system hosted on a cloud service provider in accordance with some embodiments, cloud service provider 212 serves as the processing hub for both the Convolutional Neural Network (CNN) 404 and the machine learning model 406. In some embodiments, machine learning model 406 is a generative artificial intelligence and/or machine learning mode.

CNN 404 and machine learning model 406, although illustrated as single entities, can each include multiple entities, such as CNN 404 including multiple CNNs and/or machine learning model 406 including multiple machine learning models. CNN 404 and machine learning model 406 help the IDS detect cybersecurity threats in real time, both known and unknown.

In some embodiments, cloud service provider 212 can be implemented through various architectures, such as public, private, or hybrid cloud environments, each offering different levels of scalability, security, and access control depending on the needs of the user. In some embodiments, cloud service provider 212 allows for mass scalability and resource flexibility. In some embodiments, cloud service provider 212 is a controlled environment and/or private environment for increased data security and proprietary software execution.

As illustrated in FIG. 4, CNN 404 and machine learning model 406 are hosted and executed on the cloud service provider 212. In particular, CNN 404 is used in the IDS to primarily identify known attacks. CNN 404 is designed to process large volumes of CAN data, using pre-trained models to identify statistical patterns that indicate potential cybersecurity threats. In some embodiments, data for the pre-trained models are constructed using CAN bus data from various vehicles while the vehicles were operating. In some embodiments, data for the pre-trained models includes simulated data. In some embodiments, CNN is capable of processing vast amounts of data quickly and efficiently, leveraging the cloud's computing power to deliver real-time results.

Machine learning model 406 is primarily used to identify unknown or novel attack vectors by focusing on deviations from normal CAN data patterns. Machine learning model 406 is trained using normal CAN bus data (and/or a set of images), which is converted into image-like representations using one-hot vector encoding. In some embodiments, the data is constructed in real-time and/or real-time data is used to refine one or more outputs of machine learning model 406.

Cloud service provider 212 ensures that both CNN 404 and machine learning model 406 have the computational resources required to perform their functions with high accuracy. As CAN data is transmitted from the vehicle's telematics device 210, it is sent to the cloud, where CNN 404 and machine learning model 406 analyze the incoming data streams in real time. In some embodiments, one or more outputs (e.g., outputs detecting new anomalies and/or whether an anomaly is present) from CNN 404 and/or machine learning model 406 is sent to telematic device 210, which causes an alert to be sent to a vehicle. In some embodiments, any anomalies or deviations detected are stored in database 310 of FIG. 3, so that telematic device 210 can identify whether the detected anomaly or deviation exists in real-time without output from CNN 404 and machine learning model 406. In some embodiments, the real-time update mechanism ensures that telematic device 210 of FIG. 2 remains informed of the latest potential threats and patterns, allowing telematic device 210 to adapt its intrusion detection parameters based on the most current data available.

In some embodiments, the cloud service provider 212 is connected to multiple vehicles and one or more processes aggregates data detected from the multiple vehicles to further refine outputs of CNN 404 and/or machine learning model 406. In some embodiments, the aggregation of data from multiple vehicles allows telematic device 210 and/or the IDS to remain agile, constantly refining its threat detection algorithms and enabling telematic devices to receive regular updates without a telematic device located in a particular vehicle having to identify data corresponding to a particular anomaly.

Figure 5:
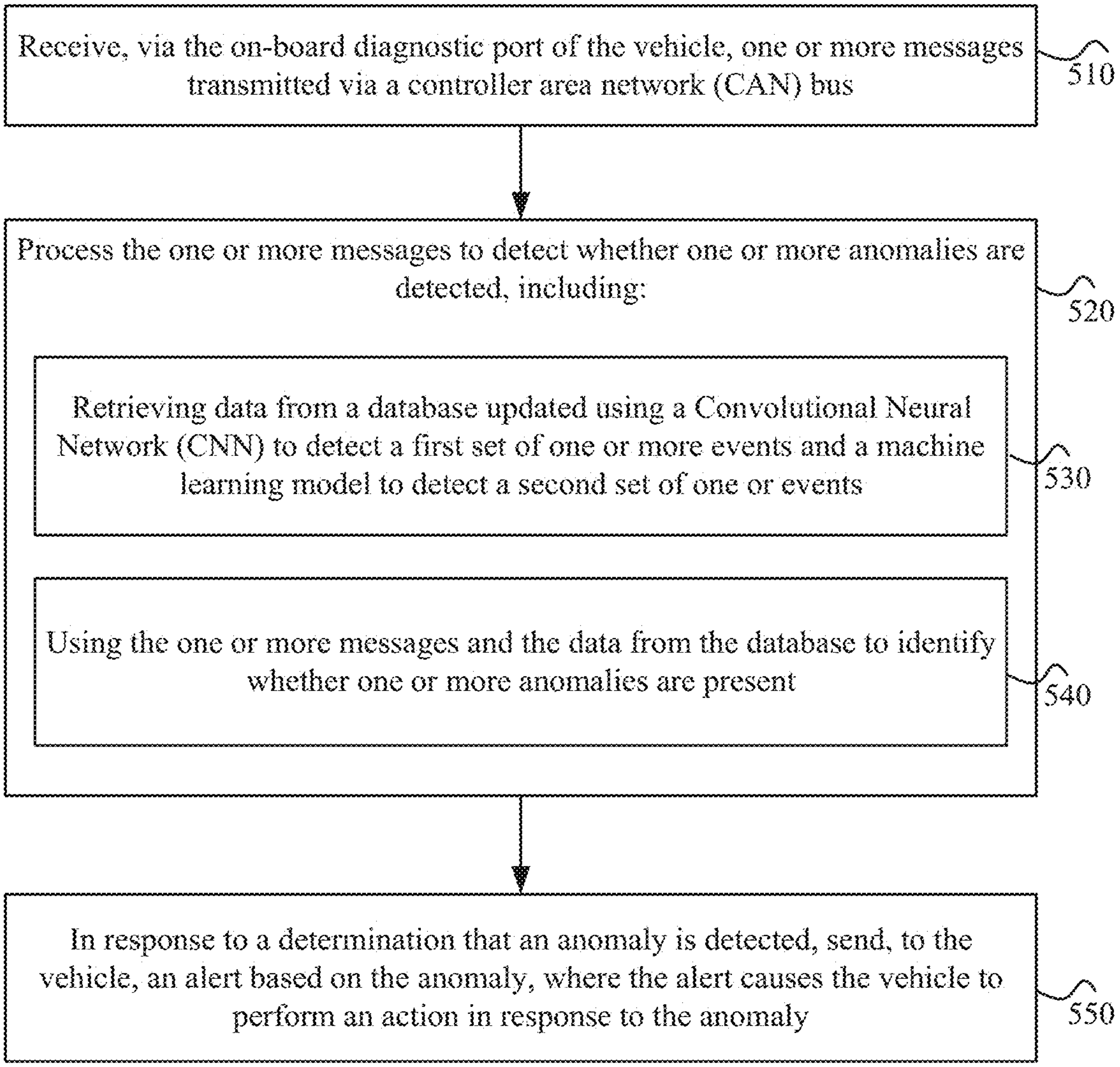
FIG. 5 is a flow diagram illustrating a method for detecting one or more anomalies in accordance with some embodiments.

FIG. 5 is a flow diagram illustrating process 500 for detecting one or more anomalies in accordance with some embodiments. In some embodiments, process 500 includes operations performed by components of a vehicle. In some embodiments, process 500 is performed by one or more components of a vehicle, where such components can be implemented in hardware and/or software. In some embodiments, process 500 is performed by a telemetric device (e.g., telemetric device 210) that is connected to (e.g., directly coupled to, connected via a set of pins, physically connected to, and/or wirelessly connected to) an onboard diagnostic port (e.g., OBD port 108) of a vehicle (e.g., a car, a truck, an airplane, and/or an electric vehicle), Some operations in process 500 are optionally combined, the order of some operations are optionally changed, and/or some operations are optionally omitted.

At block 510, process 500 includes receiving, via the onboard diagnostic port of the vehicle, one or more messages transmitted via a controller area network (CAN) bus (e.g., 110). In some embodiments, a telemetric device and/or process 500 receives the one or more messages by listening to messages sent over the CAN bus.

At block 520, process 500 includes processing the one or more messages to detect whether one or more anomalies are present (and, in some embodiments, by comparing one or more characteristics of the one or more messages to characteristics of one or more anomalies). At block 530, as a part of processing the one or more messages to detect whether one or more anomalies are present, process 500 includes retrieving data (e.g., via one or more applications, such as application 308) from a database (e.g., 310) (e.g., stored on, located within, accessible by, and/or in communication with the telematic device) updated (e.g., updated in real-time, previously updated, and/or updated in intervals of time (e.g., 1-60 seconds, hours, and/or days)) using a Convolutional Neural Network (CNN) (e.g., 404) to detect a first set of one or more events (e.g., known events, events that have previously occurred while one or more vehicles (and, in some embodiments, different vehicles that the vehicle to which the telemetric device is connected) are operating, and/or events that were previously simulated using one or more vehicles (and, in some embodiments, different vehicles that the vehicle to which the telemetric device is connected) (and, in some embodiments, the vehicle to which the telemetric device is connected and/or the telemetric device is in communication with a cloud service provider running the Convolutional Neural Network and/or one or more machine learning models) (and, in some embodiments, the cloud service provider is in communication with one or more of the different vehicles) (e.g., events involving security and/or dependability of data transmitted via the CAN bus) and a machine learning model (e.g., 406) (and/or, in some embodiments, an artificial generative intelligence model) to detect a second set of one or events (e.g., unknown events, events that have not previously occurred while one or vehicles are operating, and/or events identified by one or more artificial generative intelligence models finding one or more deviations from normal, safe, secure, non-tampered with by a third-party (e.g., non-malicious data and/or data that has not been inserted and/or changed by a malicious attacker and/or a third-party), and/or non-hijacked CAN data) (e.g., events involving security and/or dependability of data transmitted via the CAN bus). In some embodiments, the first set of one or more events is different from the second set of one or more events in that the first set of one or more events (e.g., all and/or at least one event) are unique and/or different when compared to the second set of one or more events. In some embodiments, an event in the first set of one or more events is also in the second set of one or more events.

At block 540, as a part of processing the one or more messages to detect whether one or more anomalies are present, process 500 includes using (e.g., comparing, analyzing, and/or processing) the one or more messages and the data from the database to identify whether one or more anomalies are present.

At block 508, process 500 includes, in response to a determination that an anomaly is detected, sending, to the vehicle, an alert based on the anomaly, where the alert causes the vehicle to perform an action (e.g., a counter measure and/or a counter action to eliminate, ignore, report, and/or remove the anomaly and/or an instruction that is based on the anomaly (e.g., an operation (e.g., to break, to move, to turn, to go backwards, to go forwards, to speed up, to change lanes, to stop, to pause, to park, etc.) that would have been performed if the anomaly had not been detected and/or an instruction that would have not been performed if the anomaly had been detected) in response to the anomaly. In some embodiments, the alert is sent on the CAN bus. In some embodiments, in response to a determination that an anomaly is not detected, the telematic device does not send the alert (e.g., based on the anomaly and/or another anomaly) (and/or does not cause the vehicle to perform the action to counter the anomaly. In some embodiments, the anomaly is detected by comparing the one or more messages to data that is generated from one or more outputs from and/or based on the CNN and not based on the machine learning model and/or artificial generative intelligence model. In some embodiments, the anomaly is detected by comparing the one or more messages to data that is generated from one or more outputs from and/or based on the machine learning model and/or artificial generative intelligence model and not based on the CNN. In some embodiments, the anomaly is detected by comparing the one or more messages to data that is generated from one or more outputs from and based on the CNN and not based on the machine learning model and/or artificial generative intelligence model. In some embodiments, multiple anomalies are present, and multiple alerts are sent and/or an alert that is based on and/or satisfies (and/or indicates and/or configured to cause a resolution to) the multiple anomalies is sent.

In some embodiments, the database is pre-loaded on the telematic device (and, in some embodiments, is updated thereafter). In some embodiments, before the telematic device is connected to the onboard diagnostic port, the database is loaded on the telematic device.

In some embodiments, the vehicle is a first vehicle that is connected to a cloud service provider, and wherein the database is updated in real-time based on one or more events occurring at a second vehicle that is connected to the cloud service provider and different from the first vehicle. In some embodiments, the cloud data is aggregated from different connected vehicles. In some embodiments, the cloud data is used to further refine and/or train the machine learning model and/or artificial generative intelligence model (and, in some embodiments, not the CNN).

In some embodiments, the CNN was trained using one or more datasets (e.g., pre-selected and/or training datasets) constructed from CAN bus data logs collected during simulated attacks. In some embodiments, the machine learning model was trained with images (where the images were translated and/or input into the model using one-hot vector encoding).

In some embodiments, the machine learning model was trained using CAN bus data (e.g., data and/or messages sent over and/or transmitted using the CAN bus) collected from a plurality of vehicles. In some embodiments, the CAN bus data collected from the plurality of vehicles does not include malicious data (or the majority of the data is normal, safe, secure, non-tampered with by a third-party (e.g., non-malicious data and/or data that has not been inserted and/or changed by a malicious attacker and/or a third-party)).

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A telematic device connected to an on-board diagnostic port of a vehicle, comprising:

one or more processors; and memory storing one or more programs configured to be executed by the one or more processors, the one or more programs including instructions for:

receiving, via the on-board diagnostic port of the vehicle, one or more messages transmitted via a controller area network (CAN) bus;

processing the one or more messages to detect whether one or more anomalies are present, including:

retrieving data from a database updated using a Convolutional Neural Network (CNN) to detect a first set of one or more events and a machine learning model to detect a second set of one or more events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly, wherein the vehicle is a first vehicle that is connected to a cloud service provider, and wherein the database is updated in real-time based on one or more events occurring at a second vehicle that is connected to the cloud service provider and different from the first vehicle.

2. The telematic device of claim 1, wherein the database is pre-loaded on the telematic device.

3. The telematic device of claim 1, wherein the CNN was trained using one or more datasets constructed from CAN bus data logs collected during simulated attacks.

4. The telematic device of claim 1, wherein the machine learning model was trained with images.

5. The telematic device of claim 1, wherein the machine learning model was trained using CAN bus data collected from a plurality of vehicles, and wherein the CAN bus data collected from the plurality of vehicles does not include malicious data.

6. A non-transitory computer-readable storage medium storing one or more programs configured to be executed by one or more processors, the one or more programs including instructions for receiving, via an on-board diagnostic port of the vehicle, one or more messages transmitted via a controller area network (CAN) bus;

processing the one or more messages to detect whether one or more anomalies are present, including:

retrieving data from a database updated using a Convolutional Neural Network (CNN) to detect a first set of one or more events and a machine learning model to detect a second set of one or more events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly, wherein the vehicle is a first vehicle that is connected to a cloud service provider, and wherein the database is updated in real-time based on one or more events occurring at a second vehicle that is connected to the cloud service provider and different from the first vehicle.

7. The non-transitory computer-readable storage medium of claim 6, wherein the database is pre-loaded on the telematic device.

8. The non-transitory computer-readable storage medium of claim 6, wherein the CNN was trained using one or more datasets constructed from CAN bus data logs collected during simulated attacks.

9. The non-transitory computer-readable storage medium of claim 6, wherein the machine learning model was trained with images.

10. The non-transitory computer-readable storage medium of claim 6, wherein the machine learning model was trained using CAN bus data collected from a plurality of vehicles, and wherein the CAN bus data collected from the plurality of vehicles does not include malicious data.

11. A method, comprising:

at a telematic device that is connected to an on-board diagnostic port of a vehicle:

receiving, via the on-board diagnostic port of the vehicle, one or more messages transmitted via a controller area network (CAN) bus;

processing the one or more messages to detect whether one or more anomalies are present, including:

retrieving data from a database updated using a Convolutional Neural Network (CNN) to detect a first set of one or more events and a machine learning model to detect a second set of one or more events; and using the one or more messages and the data from the database to identify whether one or more anomalies are present; and in response to a determination that an anomaly is detected, sending, to the vehicle, an alert based on the anomaly, wherein the alert causes the vehicle to perform an action in response to the anomaly, wherein the vehicle is a first vehicle that is connected to a cloud service provider, and wherein the database is updated in real-time based on one or more events occurring at a second vehicle that is connected to the cloud service provider and different from the first vehicle.

12. The method of claim 11, wherein the database is pre-loaded on the telematic device.

13. The method of claim 11, wherein the CNN was trained using one or more datasets constructed from CAN bus data logs collected during simulated attacks.

14. The method of claim 11, wherein the machine learning model was trained with images.

15. The method of claim 11, wherein the machine learning model was trained using CAN bus data collected from a plurality of vehicles, and wherein the CAN bus data collected from the plurality of vehicles does not include malicious data.

* * * * *